(12) United States Patent
Ebeling (10) Patent No.: US 10,265,816 B2
(45) Date of Patent: Apr. 23, 2019

(54) AUTOMATIC QUICK EXCHANGE TOOL FOR NUTRUNNER SOCKETS

(71) Applicants: ThyssenKrupp System Engineering GmbH, Heilbronn (DE); ThyssenKrupp AG, Essen (DE)

(72) Inventor: Ralf-Martin Ebeling, Lake Orion, MI (US)

(73) Assignees: thyssenkrupp System Engineering AG, Heilbronn (DE); thyssenkrupp AG, Essen (DE)

( * ) Notice: Subject to any disclaimer, the term of this patent is extended or adjusted under 35 U.S.C. 154(b) by 203 days.

(21) Appl. No.: 15/492,599

(22) Filed: Apr. 20, 2017

(65) Prior Publication Data
US 2018/0304423 A1   Oct. 25, 2018

(51) Int. Cl.
| | | |
|---|---|---|
| *B23Q 3/157* | (2006.01) | |
| *B23P 19/06* | (2006.01) | |
| *B23Q 3/155* | (2006.01) | |
| *B25B 21/00* | (2006.01) | |
| *B25B 23/00* | (2006.01) | |
| *B23B 31/107* | (2006.01) | |

(52) U.S. Cl.
CPC .......... *B23P 19/06* (2013.01); *B23Q 3/15526* (2013.01); *B23Q 3/15706* (2013.01); *B25B 21/00* (2013.01); *B25B 23/0035* (2013.01); *B23B 31/1071* (2013.01); *Y10T 483/1793* (2015.01); *Y10T 483/1809* (2015.01)

(58) Field of Classification Search
CPC ............ B23Q 3/15526; B23Q 3/15527; B23Q 3/15536; B23Q 3/15706; Y10T 483/1733; Y10T 483/1736; Y10T 483/1738; Y10T 483/179; Y10T 483/1793; Y10T 483/1809; Y10T 483/1864; Y10T 483/18; Y10T 279/17743; Y10T 279/17752; B23B 31/1071; B23B 31/107
USPC ......................................................... 483/901
See application file for complete search history.

(56) References Cited

U.S. PATENT DOCUMENTS

| | | | | |
|---|---|---|---|---|
| 1,109,865 A | * | 9/1914 | Nugent | ............... B23B 31/1071 279/82 |
| 3,028,770 A | * | 4/1962 | Pittwood | ................. B23B 31/00 279/900 |
| 4,053,968 A | | 10/1977 | Johnson et al. | |
| 4,520,550 A | * | 6/1985 | Dunn | .................... B23B 31/113 403/349 |
| 4,604,787 A | * | 8/1986 | Silvers, Jr. | .......... B23Q 3/15526 29/26 A |
| 4,848,196 A | | 7/1989 | Roberts | |

(Continued)

*Primary Examiner* — Daniel W Howell
(74) *Attorney, Agent, or Firm* — RMCK Law Group PLC (57) ABSTRACT

A tool exchange assembly and related method configured to swap change tool assemblies with a nutrunner constructed in accordance to one example of the present disclosure includes a nest. The nest has a lower jaw portion and an upper jaw portion. The lower jaw portion has first and second lower fingers that cooperate to define a lower slot. The upper jaw portion has first and second upper fingers that cooperate to define an upper slot. The nest is configured to receive a change tool assembly. Relative movement of the change tool assembly and the nest urges a sleeve on the change tool assembly to move between a locked position and an unlocked position.

22 Claims, 8 Drawing Sheets

(56) References Cited

U.S. PATENT DOCUMENTS

| | | | | |
|---|---|---|---|---|
| 5,271,697 | A | * | 12/1993 | Johnson .............. B23B 31/1071 279/75 |
| 5,879,277 | A | * | 3/1999 | Dettman ............ B23Q 3/15526 483/13 |
| 5,993,364 | A | * | 11/1999 | Matsuura .............. B23P 19/042 29/795 |
| 6,619,159 | B2 | | 9/2003 | Galat |
| 7,874,232 | B2 | | 1/2011 | Gauthreaux et al. |
| 8,366,592 | B2 | * | 2/2013 | Hathaway ........... B23B 31/1071 279/2.12 |
| 8,591,389 | B2 | * | 11/2013 | Tomioka ................ B23B 31/06 483/55 |
| 8,671,804 | B2 | | 3/2014 | Galat |
| 8,746,113 | B2 | | 6/2014 | Davidson et al. |
| 9,149,872 | B2 | | 10/2015 | Saur et al. |
| 2005/0176283 | A1 | * | 8/2005 | Cantlon .............. B25B 23/0035 439/282 |

* cited by examiner

AUTOMATIC QUICK EXCHANGE TOOL FOR NUTRUNNER SOCKETS

FIELD

The present disclosure relates generally to nutrunners and more specifically to a tool exchange assembly used to engage a change tool assembly for quickly and efficiently exchanging sockets.

BACKGROUND

Nutrunners can be used to facilitate the tightening of nuts onto threaded shafts or bolts into threaded ports. Nutrunners are commonly used in an assembly line where it is desirable to drive high quantities of nuts such as during assembly of components. Pneumatic nutrunners are powered by compressed air. Electric nutrunners use a direct current controller as a power supply. Hydraulic nutrunners are powered by hydraulic fluid. In general, a nutrunner can be used with a change tool assembly that couples the nutrunner with a desired socket. As can be appreciated, sometimes it is necessary to exchange sockets to accommodate different size nuts or bolts. Existing arrangements used to automatically exchange change tool assemblies and sockets tend to be inefficient. It would be desirable to provide a system that allows for quick exchange of change tool assemblies and sockets.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A tool exchange assembly configured to swap change tool assemblies carrying a socket with a nutrunner constructed in accordance to one example of the present disclosure includes a nest. The nest has a lower jaw portion and an upper jaw portion. The lower jaw portion has first and second lower fingers that cooperate to define a lower slot. The upper jaw portion has first and second upper fingers that cooperate to define an upper slot. The nest is configured to receive a change tool assembly. Relative movement of the change tool assembly driven by a robot or gantry and the nest urges a sleeve on the change tool assembly to move between a locked position and an unlocked position.

According to additional features, the tool exchange assembly includes a support plate that supports the first and second jaw assemblies. A slide arrangement allows one of the jaw assemblies to move horizontally with and vertically relative to the other jaw assembly. The support plate defines a cam thereon. A cam follower is fixed to the upper jaw assembly and is configured to ride along the cam causing the upper and lower jaw assemblies to move toward and away from each other. The upper jaw assembly urges the sleeve on the change tool assembly to move between the locked position and the unlocked position. A rail is arranged on the support plate. The rail is received by a groove defined on a base that supports the lower jaw portion. The base concurrently translates along the rail while the upper jaw translates toward the lower jaw portion while moving the change tool assembly between the locked position and the unlocked position.

According to other features, one of the lower and upper jaw portions includes a ramp surface. Slidable advancement of a change tool assembly along the ramp surface urges the sleeve on the change tool assembly to move between the locked position and the unlocked position. The ramp surface is configured on the upper jaw portion. The upper jaw portion is positioned between the lower jaw portion and the nutrunner. First and second inserts are disposed on the respective first and second lower jaw portions. The first and second inserts are formed of low friction material. In other arrangements, more or all of the upper and lower jaw portions can be formed of low friction material. The first and second jaw portions are configured to concurrently slidably engage the change tool assembly during movement of the sleeve between the locked and unlocked positions.

A tool exchange assembly configured to swap change tool assemblies with a nutrunner and constructed in accordance to another example of the present disclosure includes a lower jaw portion and an upper jaw portion. The lower jaw portion has first and second lower fingers that cooperate to define a lower slot. The upper jaw portion has first and second upper fingers that cooperate to define an upper slot. One of the lower and upper jaw portions includes a ramp surface. Slidable advancement of a change tool assembly along the ramp surface urges a sleeve on the change tool assembly to move between a locked position and an unlocked position.

According to other features, the ramp surface is configured on the upper jaw portion. The upper jaw portion is positioned between the lower jaw portion and the nutrunner. First and second inserts are disposed on respective first and second lower jaw portions. The first and second inserts are formed of low friction material. The first and second jaw portions are configured to concurrently slidably engage the change tool assembly during movement of the sleeve between the locked and unlocked positions.

The first and second upper fingers both extend between a distal end and a proximal end of the upper jaw portion. The first and second lower fingers extend between a distal end and a proximal end of the lower jaw portion. A first distance between the proximal ends is less than a second distance between the distal ends. The lower slot is configured to accommodate a change tool drive square and socket extending from the change tool assembly. The upper slot is configured to accommodate portions of the adapter.

A tool exchange assembly configured to swap change tool assemblies according to another example of the present disclosure includes a nest and at least one cam follower. The nest has a base and opposing walls. The nest is configured to receive a change tool assembly. The at least one cam follower extends from the opposing walls. The at least one cam follower engages a ramp surface on the change tool assembly causing a sleeve on the change tool assembly to move between locked and unlocked positions upon rotation of the change tool assembly within the nest.

The change tool assembly includes an access groove that receives the at least one pawl during positioning of the change tool assembly into the nest. The change tool assembly further comprises at least one stopper. Further rotation of the change tool assembly is precluded upon engagement of the at least one pawl with the at least one stopper.

A method of swapping out change tool assemblies with a nutrunner is provided. The nutrunner has a coupling element configured to mate with a change tool assembly. A first change tool assembly coupled to the nutrunner is advanced into a first nest. The first change tool assembly is further advanced into the first nest wherein the further advancing moves a first sleeve on the first change tool assembly from a locked position to an unlocked position. The coupling element is located into engagement with a second change tool assembly positioned on a second nest. The second change tool assembly is advanced away from the second nest thereby moving a second sleeve on the second change tool assembly from an unlocked position to a locked position.

In one configuration, advancing the first change tool assembly, further advancing the first change tool assembly and advancing the second change tool assembly all comprise translation of the nutrunner. In another configuration, further advancing the first change tool assembly comprises rotating the first change tool assembly with the nutrunner.

BRIEF DESCRIPTION OF THE DRAWINGS

The present disclosure will become more fully understood from the detailed description and the accompanying drawings, wherein.

DETAILED DESCRIPTION

Figure 1:
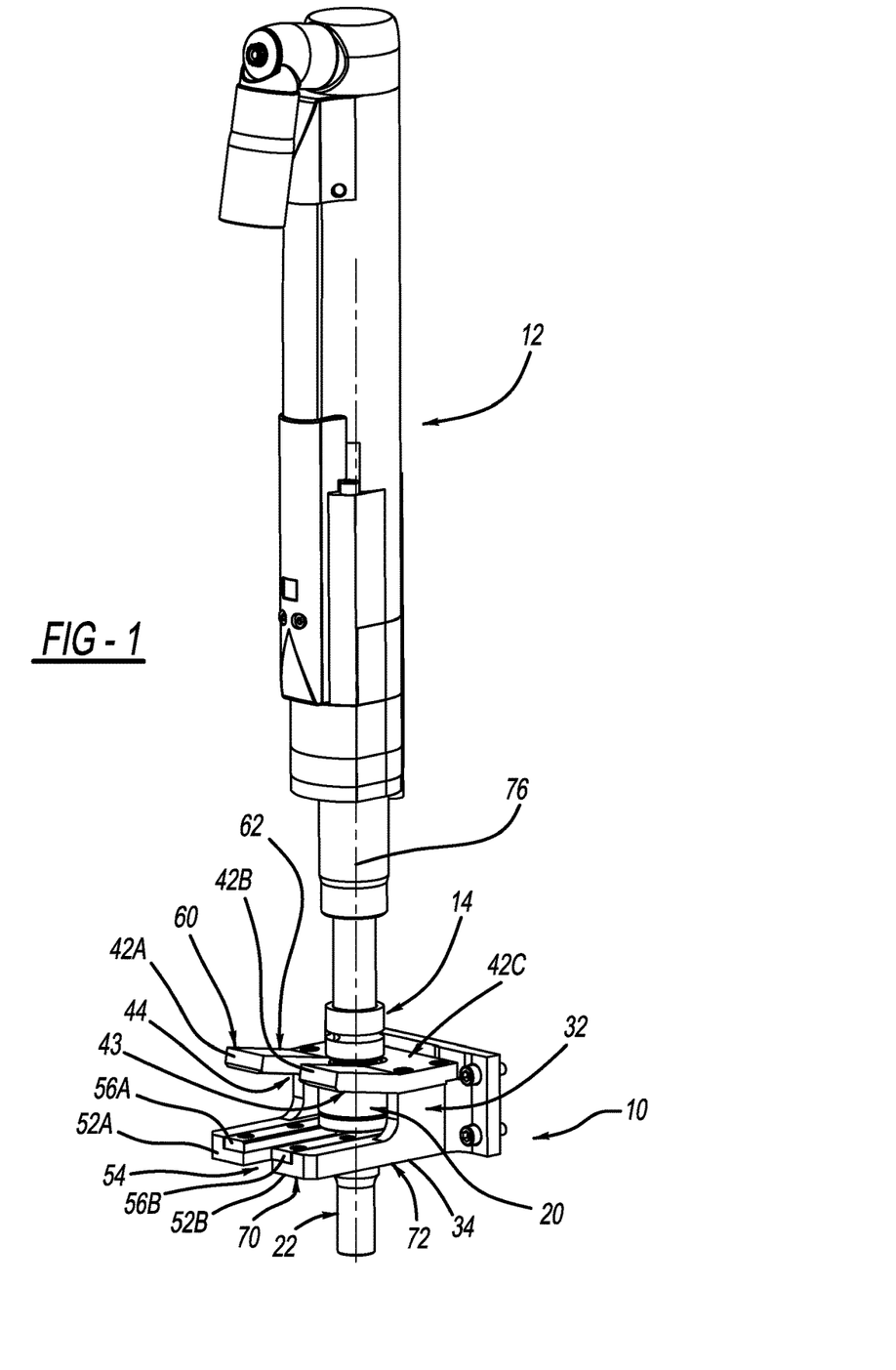
FIG. 1 is a front perspective view of a tool exchange assembly constructed in accordance to a first example of the present disclosure and shown with an exemplary nutrunner, adapter, change tool assembly and socket.

With initial reference to FIG. 1, a tool exchange assembly constructed in accordance to a first example of the present disclosure is shown and generally identified at reference 10. The tool exchange assembly 10 is shown with an exemplary nutrunner 12, a coupling element or adapter 14, change tool assembly 20 and socket 22. As will become appreciated from the following discussion, the tool exchange assembly 10 can be used to quickly and efficiently swap or exchange change tool assemblies 20 holding a socket 22. In this regard, when it becomes necessary to swap out a first change tool assembly 20 to another change tool assembly 20, such as to accommodate different sized sockets 22, a gantry or robot can use the tool exchange assembly 10 to quickly and easily move the change tool assembly 20 between locked and unlocked positions. The configurations disclosed herein provide more efficient solutions over prior art examples by utilizing an existing required machine motion to accomplish a locking and unlocking of change tool assemblies. It will be appreciated that the configuration of the nutrunner 12, adapter 14, change tool assembly 20 and socket 22 shown in the drawings and described in the specification are merely exemplary. Further, the tool exchange assembly 10 may be used with other nutrunners, adapters, change tool assemblies and/or sockets 22 within the scope of this disclosure.

With continued reference to FIG. 1 and additional reference to FIGS. 2-5, the tool exchange assembly 10 will be further described. The tool exchange assembly 10 generally includes a nest 30 having an upper jaw portion 32, a lower jaw portion 34 and a support plate 36. The upper jaw 32 includes first and second upper fingers 42A and 42B connected through an intermediate portion 42C. The first and second upper fingers 42A and 42B collectively comprise a ramp surface 43 and cooperate to define an upper slot 44. The upper slot 44 is configured to accommodate portions of the adapter 14.

Figure 2:
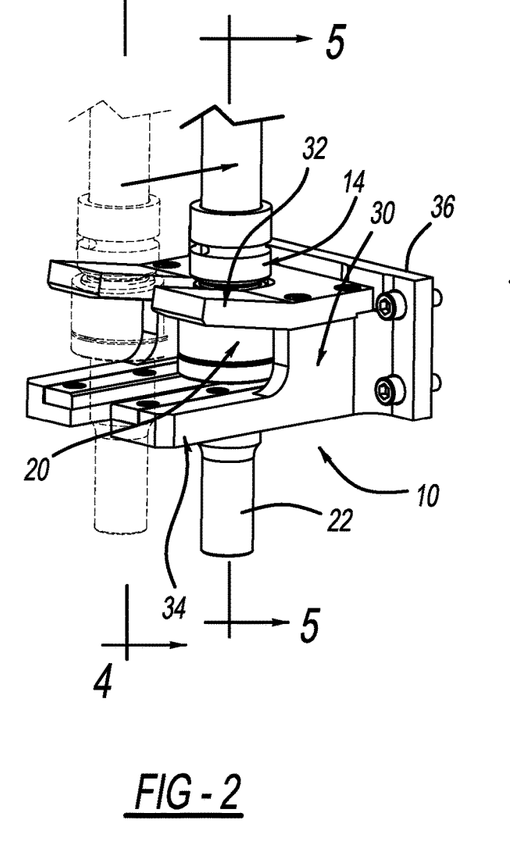
FIG. 2 is a detailed perspective view of the tool exchange assembly of FIG. 1 and shown with a change tool assembly in a locked position (phantom line) during initial entry into a nest of the tool exchange assembly and in an unlocked position (solid line) subsequent to further advancement of the tool exchange assembly into the nest.

The lower jaw portion 34 includes first and second lower fingers 52A and 52B that cooperate to define a lower slot 54. The lower jaw portion 34 further includes first and second inserts 56A and 56B disposed thereon. In one configuration the first and second inserts 56A and 56B are formed of a low friction material such as, but not limited to, plastic. As will become appreciated, the low friction material can facilitate smooth slidable advancement of the change tool assembly 20 into the nest 30. The lower slot 54 is configured to accommodate a change tool drive square and socket 22 extending from the change tool assembly 20.

The first and second upper fingers 42A and 42B both extend between a distal end 60 and a proximal end 62 of the upper jaw portion 32. Similarly, the first and second lower fingers 52A and 52B both extend between a distal end 70 and a proximal end 72 of the lower jaw portion 34. A first distance between the proximal ends 62, 72 of the first and second jaw portions 32, 34 is less than a second distance between the distal ends 60, 70 of the first and second jaw portions 32, 34. In the example shown, the first and second upper fingers 42A and 42B slope downwardly toward the proximal end 62 while the first and second lower fingers 52A and 52B are generally planar, or perpendicular to an axis 76 of the nutrunner 12. It is appreciated that in other configurations, the first and second lower fingers 52A and 52B can additionally or alternatively slope upwardly toward the proximal end 62.

Figure 3:
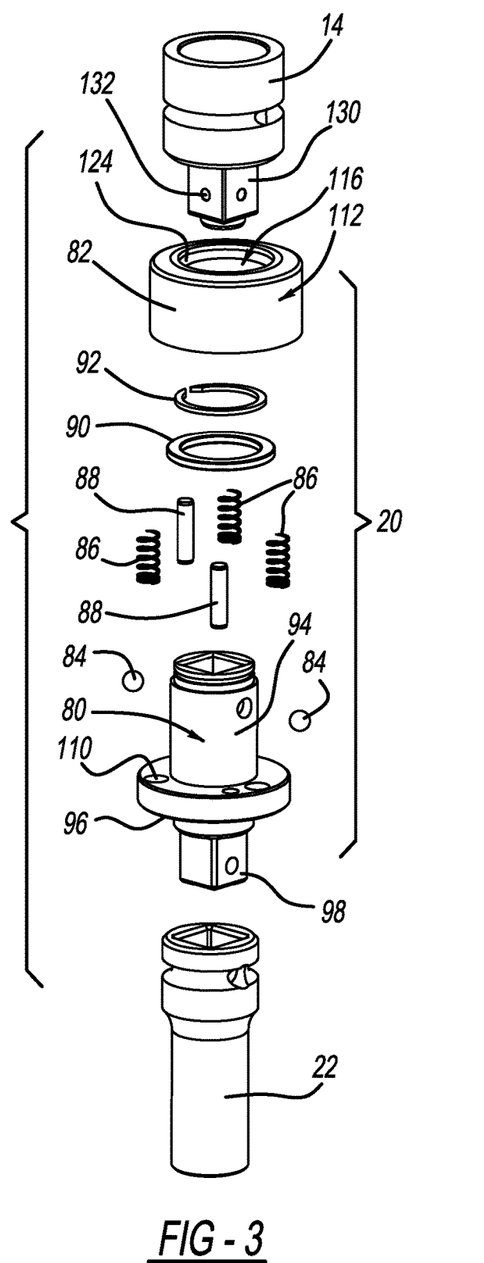
FIG. 3 is an exploded perspective view of the change tool assembly of FIG. 1 and shown with an exemplary adapter and socket.

With particular reference now to FIG. 3, the change tool assembly 20 will be described. The change tool assembly 20 generally includes a body 80, a sleeve 82, balls 84, biasing members 86, anti-rotation feature 88, a washer 90 and a snap ring 92. The body 80 includes a central boss 94 and a lower collar 96 having a change tool drive square 98 extending therefrom. The change tool drive square 98 is configured to selectively couple to the socket 22 by conventional means. The lower collar 96 further includes collar pockets 110 configured to partially receive the respective biasing members 86.

Figures 4, 5:
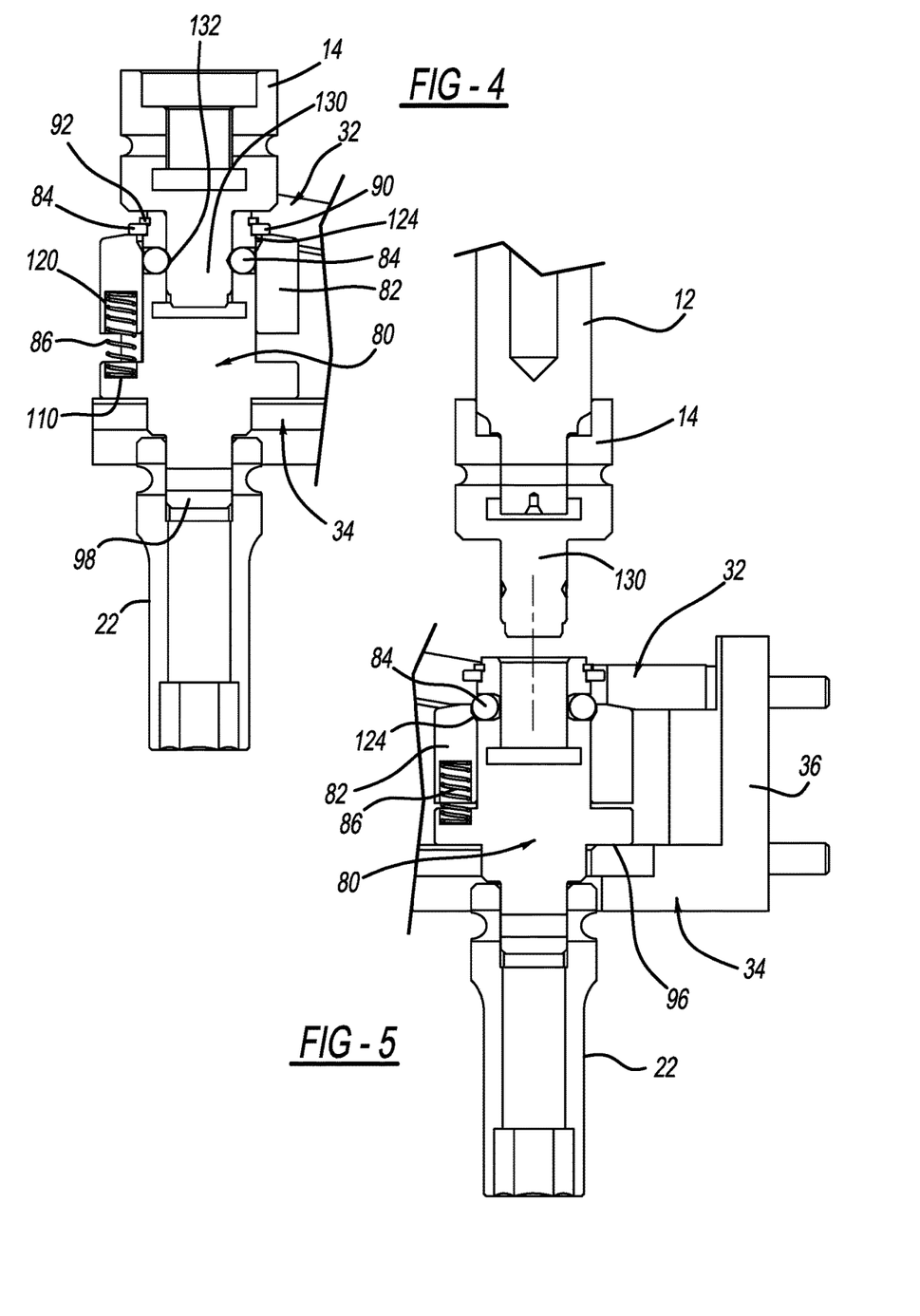
FIG. 4 is a cross-sectional view taken along lines 4-4 of FIG. 2, shown with the change tool assembly in the locked position.
FIG. 5 is a cross-sectional view taken along lines 5-5 of FIG. 2, shown with the change tool assembly in the unlocked position.

The sleeve 82 includes a sleeve body 112 that defines an upper opening 116 and sleeve pockets 120 configured to partially receive the respective biasing members 86. An annular relief 124 is formed on the sleeve 82 for accommodating the balls 84 in the unlocked position. The sleeve 82 generally receives the boss 94 of the body 80 (FIG. 4). The adapter 14 includes an adapter drive square 130 having depressions 132.

The biasing members 86 bias the sleeve 82 away from the lower collar 96 into a normally locked position (FIG. 4). In the normally locked position, the sleeve 82 urges the balls 84 into engagement with respective depressions 132 of the adapter drive square 130. In the locked position, the adapter 14 (and therefore the nutrunner 12) is fixed to the change tool assembly 10. Advancement of the sleeve 82 toward the lower collar 96 against the bias of the biasing members 86 allows the balls 84 to locate into the annular relief 124 and move radially outwardly and out of the depressions 132 of the adapter drive square 130 (FIG. 5) into an unlocked position. In the unlocked position, the adapter 14 is free to move out of the opening 116 of the sleeve 82 and therefore away from the change tool assembly 10.

A method of using the tool exchange assembly 10 according to one example of the present disclosure will now be described. It will be appreciated that a user desires to replace one change tool assembly 20 with another change tool assembly 20. A change tool assembly 20 already coupled to an adapter 14 is advanced into the nest 30. Specifically, the change tool assembly 20 is generally located into the upper and lower slots 44 and 54. As the change tool assembly 20 is progressively advanced into the nest 30, the lower collar 96 slidably advances along the inserts 56A and 56B of the lower jaw 34 while the sleeve 82 slidably advances along the first and second upper fingers 42A and 42B of the upper jaw 32.

As the sleeve 82 advances along the ramp surface 43, the sleeve 82 is forced to translate toward the lower collar 96 of the body 80 from the locked position (FIG. 4) to the unlocked position (FIG. 5). Once in the unlocked position, the adapter 14 and nutrunner 12 can leave the tool exchange assembly 10 and mate with another tool exchange assembly 10 (having a different socket). As can be appreciated, once the adapter drive square 130 is inserted into the opening 116 of the new change tool assembly 20, the change tool assembly 20 is slidably advanced out of the nest 30 causing the sleeve 82 to move from the unlocked position (FIG. 5) to the locked position (FIG. 4). The exchange of change tool assemblies can therefore be accomplished by taking advantage of horizontal movement of the nutrunner 10 by the robot without requiring any supplemental manipulation or introducing other input forces.

Turning now to FIGS. 6-9, a tool exchange assembly constructed in accordance to a second example of the present disclosure is shown and generally identified at reference 210. The tool exchange assembly 210 is shown with the exemplary nutrunner 12, adapter 14 and change tool assembly 20. As will become appreciated from the following discussion, the tool exchange assembly 210 can be used to quickly and efficiently exchange change tool assemblies 20. In this regard, when it becomes necessary to swap out a first change tool assembly 20 to another change tool assembly 20, such as to accommodate different sized sockets 22, a user can use the tool exchange assembly 210 to quickly and easily move the change tool assembly 20 between locked and unlocked positions.

Figure 6:
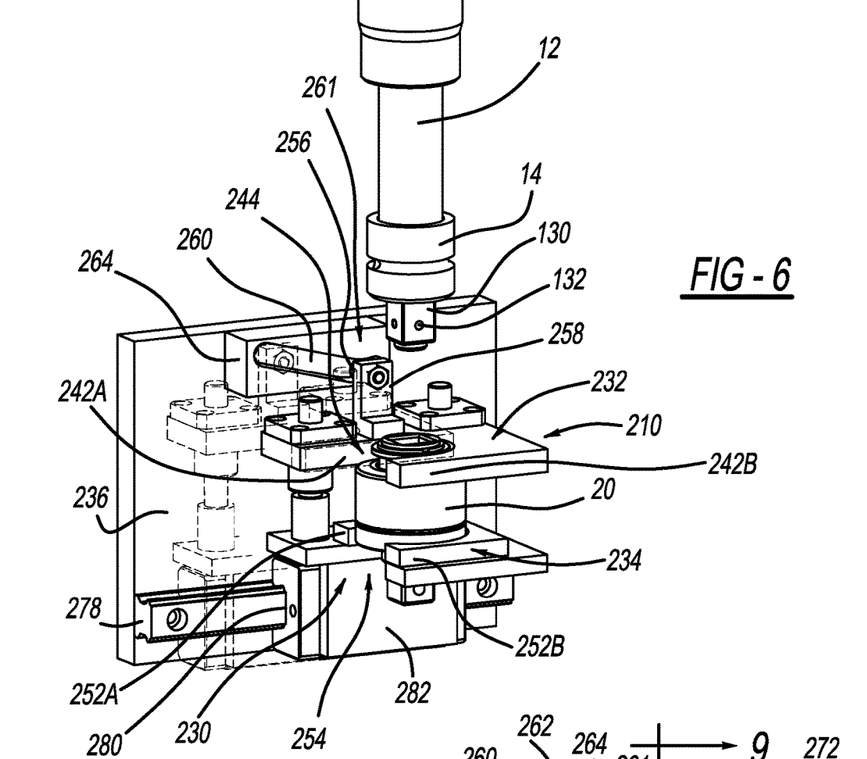
FIG. 6 is a front perspective view of a tool exchange assembly constructed in accordance to a second example of the present disclosure and shown with an exemplary nutrunner, adapter and change tool assembly, the change tool assembly shown in an unlocked position.
Figure 7:
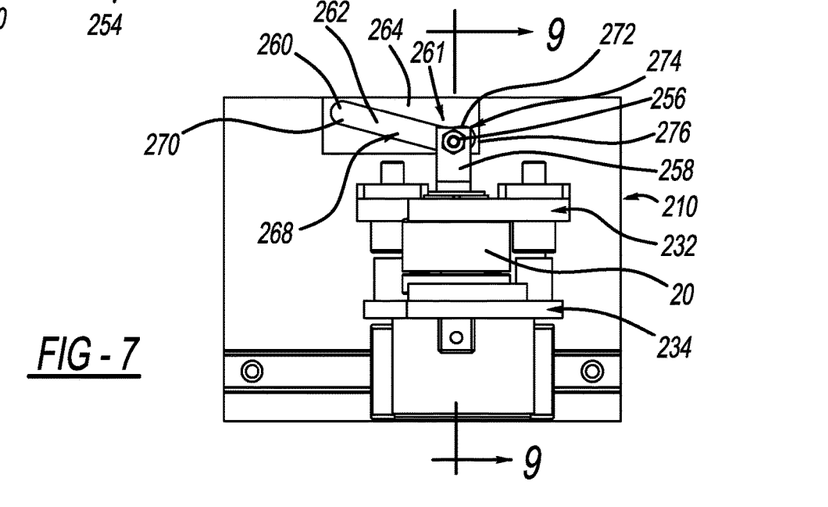
FIG. 7 is a side view of the tool exchange assembly of FIG. 6 and shown with the change tool assembly in the unlocked position.

The tool exchange assembly 210 generally includes a nest 230 having an upper jaw portion 232, a lower jaw portion 234 and a support plate 236. The upper jaw 232 includes first and second upper fingers 242A and 242B connected through an intermediate portion 242C. The first and second upper fingers 242A and 242B cooperate to define an upper slot 244. The lower jaw portion 234 includes first and second lower fingers 252A and 252B that cooperate to define a lower slot 254. The upper jaw 232 includes a cam follower 256 extending from a support bracket 258. The cam follower 256 is received in a cam 260 provided on the support plate 236. The cam follower 256 and cam 260 cooperate to provide a cam arrangement 261. In the example shown, the cam 260 includes a groove 262 defined in a block 264 positioned on the support plate 236. The cam 260 has a ramp portion 268 that slopes generally downwardly from a first cam location 270 to a second cam location 272. The cam 260 further includes a flat portion 274 that remains generally planar from the second cam location 272 to a third cam location 276.

A rail 278 is arranged on the support plate 236 and is received by a groove 280 defined in a base 282 that supports the lower jaw portion 234. The cam 260 and cam follower 256 cooperate to provide two motions. The base 282 concurrently translates along the rail 278 while the upper jaw portion 232 translates toward the lower jaw portion 234. A slide unit 284 (FIG. 8) allows vertical or parallel movement of the upper jaw portion 232 toward the lower jaw portion 234. The slide unit 284 can include round shafts and ball bushings or other mechanical arrangements that facilitate such movement.

Figure 8:
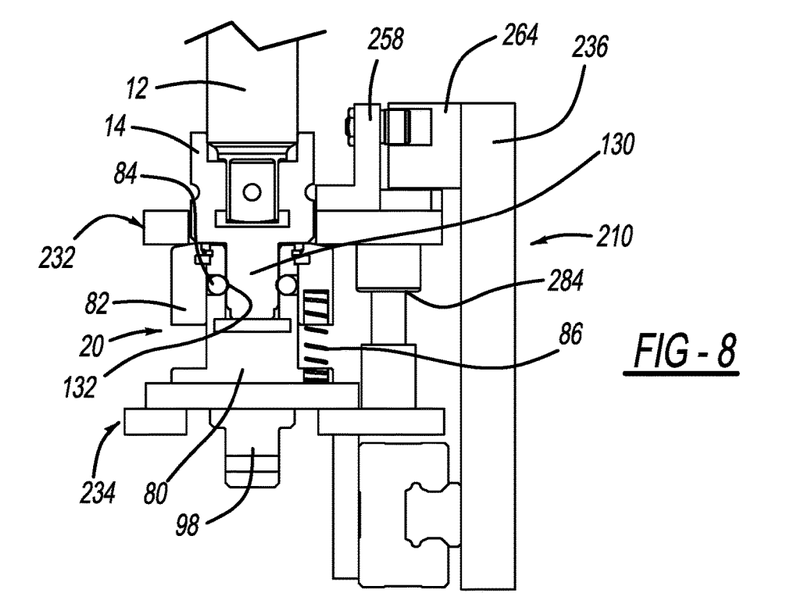
FIG. 8 is a cross-sectional view of the tool exchange assembly shown with the change tool assembly in the locked position.
Figure 9:
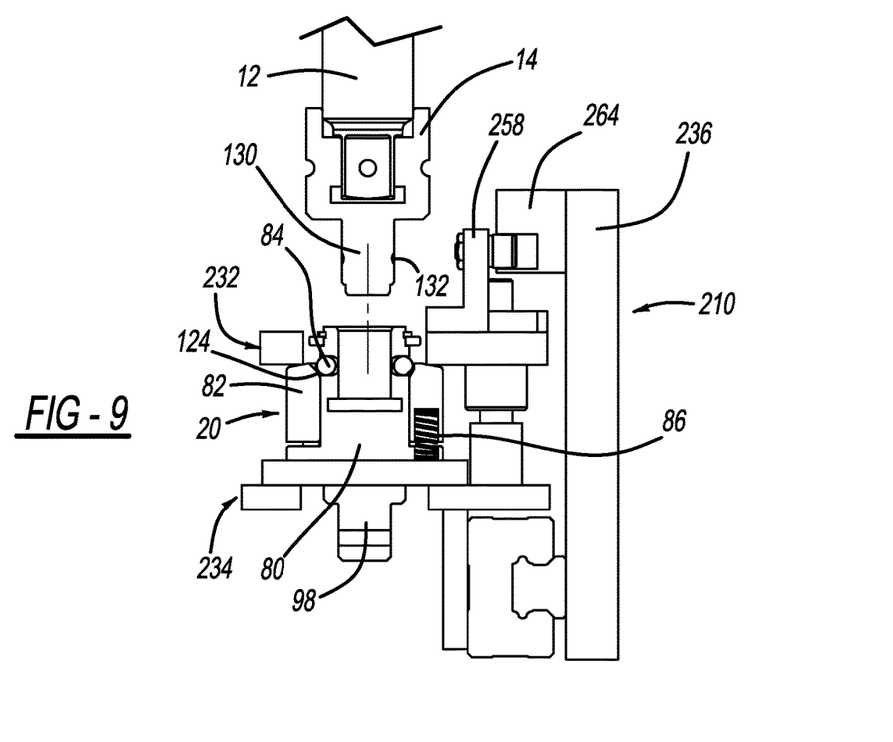
FIG. 9 is a cross-sectional view taken along lines 9-9 of FIG. 7 and shown with the change tool assembly in the unlocked position.

A method of using the tool exchange assembly 210 according to one example of the present disclosure will now be described. It will be appreciated that a user desires to replace one change tool assembly 20 with another change tool assembly 20. A change tool assembly 20 already coupled to an adapter 14 is advanced into the nest 230. Specifically, the change tool assembly 20 is generally located into the upper and lower slots 244 and 254. Once the change tool assembly 20 is located into the nest 230, the nest 230 is advanced rightward as viewed in FIG. 6 from the phantom position to the solid position. Advancement of the nest 230 causes the cam follower 256 to ride along the ramp 268 of the cam 260 causing the upper jaw portion 232 to move toward the lower jaw portion 234. Movement of the upper jaw portion 232 toward the lower jaw portion 234 causes the sleeve 82 to translate toward the lower collar 96 of the body 80 from the locked position (FIG. 8) to the unlocked position (FIG. 9). Once in the unlocked position, the adapter 14 and nutrunner 12 can leave the tool exchange assembly 210 and mate with another tool exchange assembly 210 (having a different socket). As can be appreciated, once the adapter drive square 130 is inserted into the opening 116 of the new change tool assembly 20, the nest 230 can be advanced leftward as viewed in FIG. 6 causing the sleeve 82 to move from the unlocked position (FIG. 9) to the locked position (FIG. 8). Similar to the tool exchange assembly 10 above, the exchange of change tool assemblies with the tool exchange assembly 210 can therefore be accomplished by taking advantage of horizontal movement of the nutrunner 12 by the robot without requiring any supplemental manipulation or introducing other input forces.

Turning now to FIGS. 10-15, a tool exchange assembly constructed in accordance to a third example of the present disclosure is shown and generally identified at reference 310. The tool exchange assembly 310 is shown with a change tool assembly 320 and the exemplary nutrunner 12 and adapter 14. As will become appreciated from the following discussion, the tool exchange assembly 310 can be used to quickly and efficiently exchange change tool assemblies 320. In this regard, when it becomes necessary to swap out a first change tool assembly 320 to another change tool assembly 320, such as to accommodate different sized sockets 22, a user can use the tool exchange assembly 310 to quickly and easily move the change tool assembly 320 between locked and unlocked positions. The change tool assembly 320 is constructed similarly to the change tool assembly 20 described above except as described herein. Common components have been identified with like reference numerals. The change tool assembly 320 includes a sleeve 324 having cam or ramp surfaces 326 and stoppers 328. Access grooves 329 are defined generally vertically along the change tool assembly 320 at diametrically opposed locations.

Figures 10, 11:
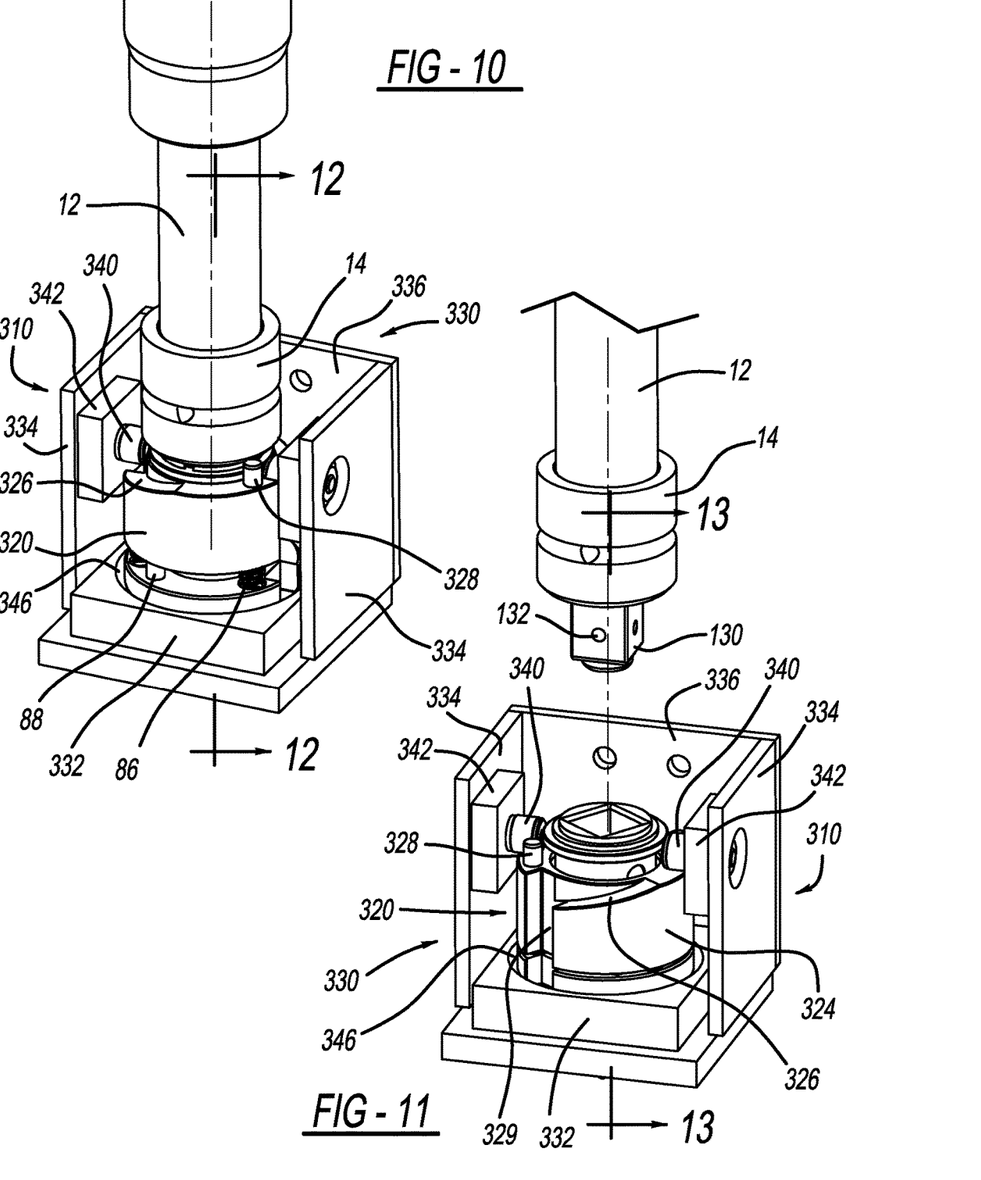
FIG. 10 is a front perspective view of a tool exchange assembly constructed in accordance to a third example of the present disclosure and shown with an exemplary nutrunner, adapter and change tool assembly, the change tool assembly shown in a locked position.
FIG. 11 is a front perspective view of the tool exchange assembly of FIG. 10 and shown with the change tool assembly in an unlocked position.

The tool exchange assembly 310 generally includes a nest 330 having a base 332, opposing walls 334 and a rear wall 336. Opposing cam followers or pawls 340 extend from support blocks 342 mounted to the opposing walls 334. The base 332 defines a recess 346 that partially receives the change tool assembly 320.

Figures 12, 13:
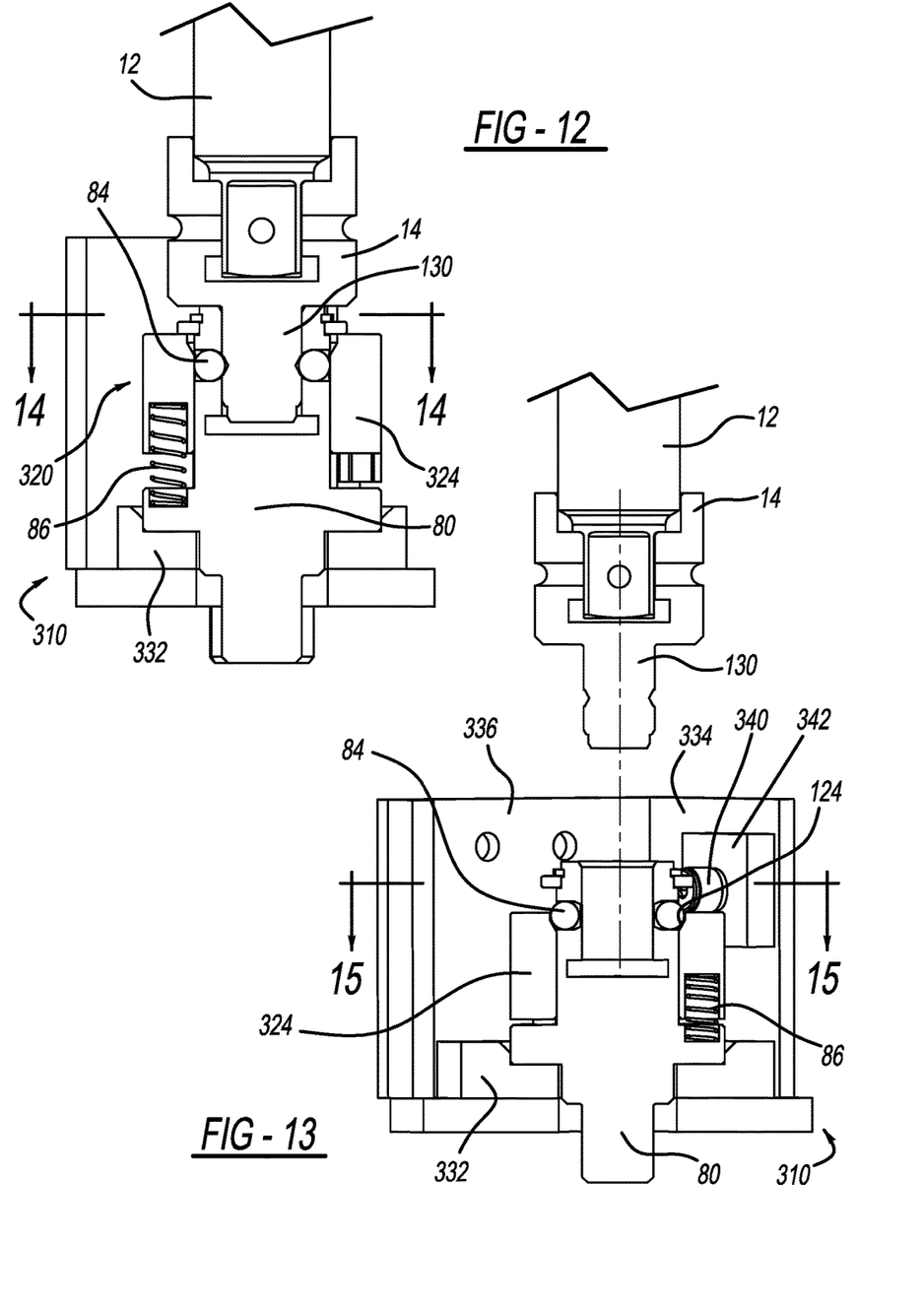
FIG. 12 is a cross-sectional view taken along lines 12-12 of FIG. 10.
FIG. 13 is a cross-sectional view taken along lines 13-13 of FIG. 11.
Figure 14:
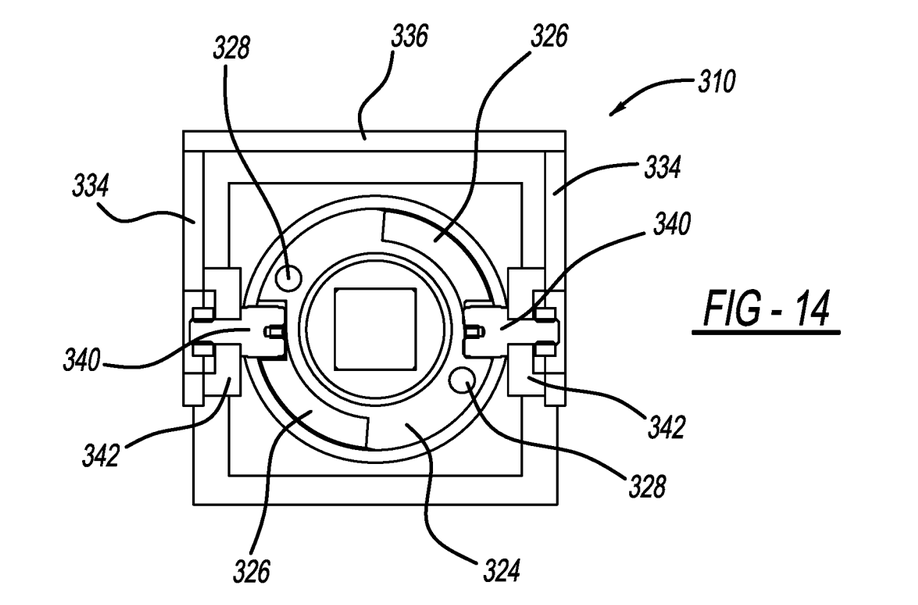
FIG. 14 is a cross-sectional view taken along lines 14-14 of FIG. 12.
Figure 15:
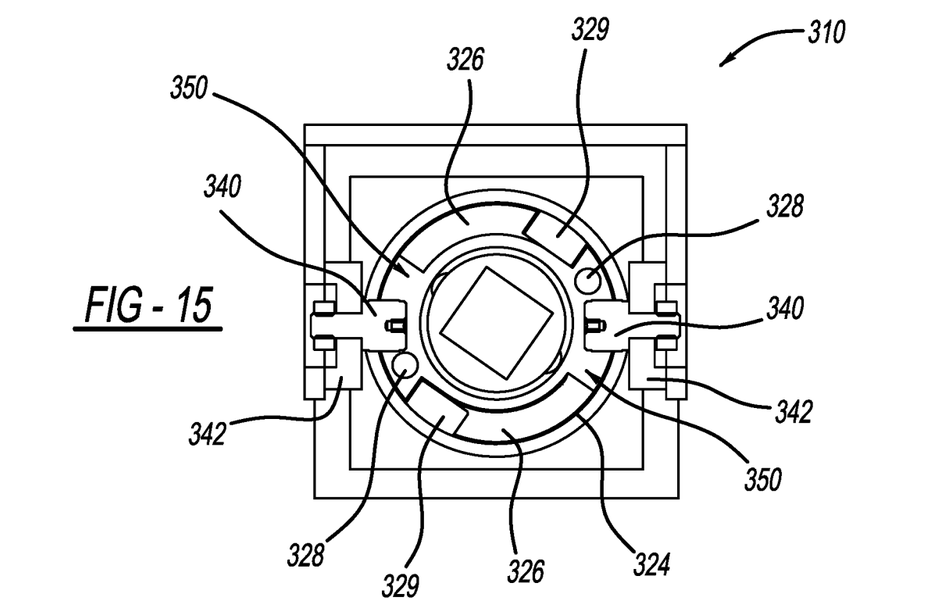
FIG. 15 is a cross-sectional view taken along lines 15-15 of FIG. 13.

A method of using the tool exchange assembly 310 according to one example of the present disclosure will now be described. It will be appreciated that a user desires to replace one change tool assembly 320 with another change tool assembly 320. A change tool assembly 320 already coupled to an adapter 14 is advanced into the nest 330. Specifically, the access grooves 329 are aligned with the pawls 340. The change tool assembly 320 is advanced into the recess 346 while the respective pawls 340 pass through the grooves 329. Next, the change tool assembly 320 is rotated by the nutrunner 12 causing the pawls 340 to ride along the ramps 326 urging the sleeve 324 downwardly from the locked position (FIG. 12) to the unlocked position (FIG. 13). The change tool assembly 320 can be further rotated onto resting platforms 350 provided on the sleeve 324 between the ramps 326 and the stoppers 328. The stoppers 328 engage the pawls 340 inhibiting further rotation. Once in the unlocked position, the adapter 14 and nutrunner can leave to tool exchange assembly 310 and mate with another tool exchange assembly 310 (having a different socket). Similar to the tool exchange assemblies 10 and 210 above, the exchange of change tool assemblies with the tool exchange assembly 310 can be accomplished by taking advantage of movement of the nutrunner 12 by the robot (in this case rotational movement) without requiring any supplemental manipulation or introducing other input forces.

The foregoing description of the embodiments has been provided for purposes of illustration and description. It is not intended to be exhaustive or to limit the disclosure. For example, while the embodiments disclosed above include a coupling member or adapter 14, it is contemplated that in other examples, the nutrunner 12 can have an integrally formed coupling member and/or be configured to directly couple to change tool assemblies. Individual elements or features of a particular embodiment are generally not limited to that particular embodiment, but, where applicable, are interchangeable and can be used in a selected embodiment, even if not specifically shown or described. The same may also be varied in many ways. In this regard, the ordering of method steps is not necessarily fixed, but may be capable of being modified without departing from the instant teachings. Such variations are not to be regarded as a departure from the disclosure, and all such modifications are intended to be included within the scope of the disclosure.

What is claimed is:

1. A tool exchange assembly configured to swap change tool assemblies with a nutrunner, the tool exchange assembly comprising:
   a nest having (i) a lower jaw portion having first and second lower fingers that cooperate to define a lower slot, and (ii) an upper jaw portion having first and second upper fingers that cooperate to define an upper slot, wherein the nest is configured to receive a change tool assembly; and
   wherein relative movement of the change tool assembly and the nest urges a sleeve on the change tool assembly to move between a locked position and an unlocked position.

2. The tool exchange assembly of claim 1, further comprising a support plate that supports the first and second jaw assemblies, the support plate defining a cam thereon.

3. The tool exchange assembly of claim 2, further comprising a cam follower fixed to the upper jaw assembly, the cam follower configured to ride along the cam causing the upper and lower jaw assemblies to move toward and away from each other.

4. The tool exchange assembly of claim 3 wherein the upper jaw assembly urges the sleeve on the change tool assembly to move between the locked position and the unlocked position.

5. The tool exchange assembly of claim 2 further comprising a rail arranged on the support plate that is received by a groove defined in a base that supports the lower jaw portion, wherein the base concurrently translates along the rail while the upper jaw translates toward the lower jaw portion while moving the change tool assembly between the locked position and the unlocked position.

6. The tool exchange assembly of claim 1 wherein one of the lower and upper jaw portion includes a ramp surface, wherein slidable advancement of a change tool assembly along the ramp surface urges the sleeve on the change tool assembly to move between the locked position and an unlocked position.

7. The tool exchange assembly of claim 6 wherein the ramp surface is configured on the upper jaw portion, the upper jaw portion positioned between the lower jaw portion and the nutrunner.

8. The tool exchange assembly of claim 7, further comprising first and second inserts disposed on the respective first and second lower jaw portions, the first and second inserts formed of low friction material.

9. The tool exchange assembly of claim 7 wherein the first and second jaw portions are configured to concurrently slidably engage the change tool assembly during movement of the sleeve between the locked and unlocked positions.

10. A tool exchange assembly configured to swap change tool assemblies with a nutrunner, the tool exchange assembly comprising:
    a lower jaw portion having first and second lower fingers that cooperate to define a lower slot;

an upper jaw portion having first and second upper fingers that cooperate to define an upper slot; and wherein one of the lower and upper jaw portion includes a ramp surface, wherein slidable advancement of a change tool assembly along the ramp surface urges a sleeve on the change tool assembly to move between a locked position and an unlocked position.

11. The tool exchange assembly of claim 10 wherein the ramp surface is configured on the upper jaw portion, the upper jaw portion positioned between the lower jaw portion and the nutrunner.

12. The tool exchange assembly of claim 11, further comprising first and second inserts disposed on the respective first and second lower jaw portions, the first and second inserts formed of low friction material.

13. The tool exchange assembly of claim 12 wherein the first and second jaw portions are configured to concurrently slidably engage the change tool assembly during movement of the sleeve between the locked and unlocked positions.

14. The tool exchange assembly of claim 10 wherein (i) the first and second upper fingers both extend between a distal end and a proximal end of the upper jaw portion, and (ii) the first and second lower fingers extend between a distal end and a proximal end of the lower jaw portion, wherein a first distance between the proximal ends is less than a second distance between the distal ends.

15. The tool exchange assembly of claim 10 wherein the lower slot is configured to accommodate a change tool drive square extending from the change tool assembly.

16. The tool exchange assembly of claim 10 wherein the upper slot is configured to accommodate portions of the adapter.

17. A tool exchange assembly configured to swap change tool assemblies with a nutrunner, the tool exchange assembly comprising:
    a nest having a base and opposing walls, wherein the nest is configured to receive a change tool assembly;
    at least one cam follower extending from the opposing walls; and
    wherein the at least one cam follower engages a ramp surface on the change tool assembly causing a sleeve on the change tool assembly to move between locked and unlocked positions upon rotation of the change tool assembly within the nest.

18. The tool exchange assembly of claim 17, further comprising the change tool assembly, wherein the change tool assembly comprises an access groove that receives the at least one pawl during positioning of the change tool assembly into the nest.

19. The tool exchange assembly of claim 18 wherein the change tool assembly further comprises at least one stopper, wherein further rotation of the change tool assembly is precluded upon engagement of the at least one pawl with the at least one stopper.

20. A method of swapping out change tool assemblies with a nutrunner, the nutrunner having a coupling element configured to mate with a change tool assembly, the method comprising:
    advancing a first change tool assembly coupled to the nutrunner into a first nest;
    further advancing the first change tool assembly into the first nest wherein the further advancing moves a first sleeve on the first change tool assembly from a locked position to an unlocked position;
    locating the coupling element into engagement with a second change tool assembly positioned on a second nest; and
    advancing the second change tool assembly away from the second nest thereby moving a second sleeve on the second change tool assembly from an unlocked position to a locked position.

21. The method of claim 20 wherein (i) advancing the first change tool assembly, (ii) further advancing of the first change tool assembly, and (iii) advancing the second change tool assembly all comprise translation of the nutrunner.

22. The method of claim 21 wherein the further advancing the first change tool assembly comprises rotating the first change tool assembly with the nutrunner.

* * * * *